United States Patent [19]

Martin

[11] Patent Number: 4,771,086

[45] Date of Patent: Sep. 13, 1988

[54] ENCAPSULATING FINELY DIVIDED SOLID PARTICLES IN STABLE SUSPENSIONS

[75] Inventor: Robert W. Martin, S. Charleston, W. Va.

[73] Assignee: Union Carbide Corporation, Danbury, Conn.

[21] Appl. No.: 899,207

[22] Filed: Aug. 22, 1986

Related U.S. Application Data

[60] Division of Ser. No. 758,850, Jul. 26, 1985, Pat. No. 4,608,401, which is a continuation-in-part of Ser. No. 583,818, Feb. 27, 1984, abandoned, which is a continuation-in-part of Ser. No. 516,859, Jul. 25, 1983, abandoned, which is a continuation-in-part of Ser. No. 414,392, Sep. 2, 1982, abandoned.

[51] Int. Cl.$^4$ .......................... C08K 9/04; C08K 3/10; C08K 9/10

[52] U.S. Cl. .................... 523/205; 523/137; 523/200; 523/209; 524/413; 524/497; 524/733; 524/760; 524/762; 524/766; 524/767; 524/780; 524/785; 524/808; 524/832

[58] Field of Search ............... 523/137, 200, 205, 209; 524/785, 413, 497, 733, 760, 762, 766, 780, 787

[56] References Cited

U.S. PATENT DOCUMENTS

| | | | |
|---|---|---|---|
| 2,040,818 | 5/1936 | Badollet | 210/203 |
| 2,558,302 | 6/1951 | Marcot et al. | 106/304 |
| 2,637,394 | 8/1954 | Somermeyer | 260/41 |
| 2,876,133 | 3/1959 | Iler et al. | 117/54 |
| 2,982,762 | 5/1961 | Vocks et al. | 260/88.3 |
| 3,083,118 | 3/1963 | Bridgeford | 117/47 |
| 3,133,893 | 5/1964 | Newman | 260/41 |
| 3,166,429 | 1/1965 | Wich | 106/176 |
| 3,200,007 | 8/1965 | Flowers | 117/138.8 |
| 3,223,518 | 12/1965 | Hansen | 71/64 |
| 3,232,903 | 2/1966 | Schmidle et al. | 260/33.6 |
| 3,330,693 | 7/1967 | Rumberger | 117/161 |
| 3,359,130 | 12/1967 | Goldman | 117/72 |
| 3,393,162 | 6/1968 | Cox | 260/4 |
| 3,393,165 | 7/1968 | Evans | 260/22 |
| 3,492,253 | 1/1970 | Katz | 260/17 |
| 3,502,582 | 3/1970 | Clemens | 252/62.1 |
| 3,519,594 | 7/1970 | Michaels | 260/14 |
| 3,532,662 | 10/1970 | Ansdell | 260/34.2 |
| 3,544,500 | 12/1970 | Osmond et al. | 260/29.6 |
| 3,661,620 | 5/1972 | Dekking et al. | 117/124 |
| 3,677,804 | 7/1972 | Kalnin et al. | 117/100 A |
| 3,691,090 | 9/1972 | Kitajima et al. | 252/316 |
| 3,714,102 | 1/1973 | Peiss | 260/29.6 |
| 3,763,084 | 10/1973 | Grudus et al. | 260/40 R |
| 3,834,923 | 9/1974 | Hodgkin et al. | 106/300 |
| 3,839,064 | 10/1974 | Vincent | 106/308 M |
| 3,855,172 | 12/1974 | Iler | 260/39 R |
| 3,876,603 | 4/1975 | Makhlouf | 260/31.2 N |
| 3,879,335 | 4/1975 | Storck et al. | 260/37 EP |
| 3,884,871 | 5/1975 | Herman | 260/42.14 |
| 3,891,572 | 6/1975 | Moody et al. | 252/316 |
| 3,897,586 | 7/1975 | Coker | 428/403 |
| 3,904,562 | 9/1975 | Hopfenberq et al. | 260/22 CB |
| 3,925,096 | 12/1975 | Karkov | 106/309 |
| 3,929,502 | 12/1975 | Hodgkin et al. | 106/300 |
| 3,935,339 | 1/1976 | Cooke | 427/216 |
| 3,953,657 | 4/1976 | Yamaguchi et al. | 428/406 |
| 3,991,007 | 11/1976 | Perronlon et al. | 260/42.14 |
| 4,007,141 | 2/1977 | Wismer et al. | 260/2.5 B |

(List continued on next page.)

FOREIGN PATENT DOCUMENTS

| | | |
|---|---|---|
| 603430 | 8/1960 | Canada. |
| 899723 | 5/1972 | Canada. |
| 7514188 | 12/1981 | Fed. Rep. of Germany. |
| 1330500 | 5/1963 | France. |
| 773325 | 4/1985 | South Africa. |
| 773325 | 4/1985 | South Africa. |
| 773325 | 4/1985 | South Africa. |
| 1005434 | 9/1965 | United Kingdom. |
| 1506236 | 4/1978 | United Kingdom. |
| 1536443 | 12/1978 | United Kingdom. |
| 1537986 | 1/1979 | United Kingdom. |

*Primary Examiner*—Herbert J. Lilling
*Attorney, Agent, or Firm*—Robert J. Feltovic

[57] ABSTRACT

Finely divided water insoluble solid particles free of ionic charges and ranging in size from about 0.01 to several hundred microns or higher, including but not limited to paint pigment particles, are given a generally uniform polymeric encapsulation by admixing such particles in an aqueous reaction medium with a water insoluble monomer polymerizable to form a generally water insoluble polymer free of ionic charges in the presence of a nonionic surface active stabilizing agent, preferably a polyethoxylated alkyl phenol containing at least about eight carbon atoms in the alkyl group thereof and preferably at least about 40–50 ethylene oxide groups per molecule, and polymerization of the monomer is then initiated, usually with heating, with a redox polymerization initiating system which is free of ionic groups and does not decompose to release ionic groups in the reaction medium. Naturally agglomerated particulate materials are effectively dispersed in situ during polymerization, eliminating the necessity for preliminary grinding and/or dispersion treatments. Monomers generally useful for emulsion polymerization and free of ionic groups are effective and reaction conditions are generally the same as employed in emulsion polymerization. The polymerization product is a suspension of generally discrete particles enveloped within a polymeric coating which exhibits remarkable stability against flocculation or settling. White paint pigments, e.g., titanium dioxide, encapsulated in this manner exhibit greatly increased hiding power, while colored pigments exhibit greater brilliance and depth of color in dried paint films, and the film in either case has much improved abrasion or scrub resistance, and much improved stain resistance due to reduced porosity, all compared to equivalent conventional latex paints.

11 Claims, No Drawings

U.S. PATENT DOCUMENTS

| | | | |
|---|---|---|---|
| 4,013,615 | 3/1977 | Ohashi et al. | 260/42.53 |
| 4,042,476 | 8/1977 | Collins et al. | 204/159.15 |
| 4,048,138 | 9/1977 | Miga | 260/42.37 |
| 4,090,887 | 5/1978 | Marquisee et al. | 106/288 B |
| 4,107,126 | 8/1978 | Burke et al. | 260/38 |
| 4,107,132 | 8/1978 | Burke et al. | 260/42.14 |
| 4,110,492 | 8/1978 | Hayman | 427/214 |
| 4,132,561 | 1/1979 | Burke, Jr. et al. | 106/308 |
| 4,132,562 | 1/1979 | Burke, Jr. et al. | 106/308 M |
| 4,132,563 | 1/1979 | Burke et al. | 106/308 M |
| 4,132,564 | 1/1979 | Burke et al. | 106/308 M |
| 4,143,026 | 3/1979 | Panek et al. | 260/42.14 |
| 4,154,621 | 5/1979 | Burke, Jr. et al. | 106/308 M |
| 4,157,323 | 6/1979 | Yen et al. | 260/29.7 M |
| 4,166,811 | 9/1979 | Marr et al. | 260/27 R |
| 4,209,430 | 6/1980 | Weber | 260/23 H |
| 4,248,765 | 2/1981 | Patil et al. | 260/42.53 |
| 4,265,960 | 5/1981 | Arbit et al. | 428/220 |
| 4,421,660 | 12/1983 | Solc | 252/62.54 |
| 4,609,608 | 9/1986 | Sole | 430/106.6 |
| 4,654,267 | 3/1987 | Ugelstad et al. | 428/407 |

ENCAPSULATING FINELY DIVIDED SOLID PARTICLES IN STABLE SUSPENSIONS

This application is a divisional application of application Ser. No. 758,850, filed July 26, 1985, now U.S. Pat. No. 4,608,401, which is a continuation-in-part application of application Ser. No. 583,818, filed Feb. 27, 1984, now abandoned, which is a continuation-in-part application of Ser. No. 516,859, filed July 25, 1983, now abandoned, which is a continuation-in-part application of Ser. No. 414,392, filed Sept. 2, 1982, now abandoned.

1. FIELD OF THE INVENTION

This invention relates to the encapsulation with polymer of finely divided solid particles and is concerned more particularly with a direct and simply executed method for applying a polymeric envelope or coating to finely divided solid particles, especially pigment particles utilized in paints and similar opacified coating compositions.

2. BACKGROUND OF THE INVENTION

There exists a great need in the art for a simple, uncomplicated and readily executed procedure for applying a polymer coating or envelope around finely divided solid particles. While such a technique would be valuable in a variety of fields, its value is especially strong in the field of paint and similar coating formulations. Paint formulations separate basically into two types: The oil-based paint where the polymeric or resinous binder is dissolved in an organic solvent as a continuous phase with the pigment particles dispersed therein as discrete particles and a latex-based paint wherein the polymer or resinous binder exists as a dispersed phase or latex separately prepared by emulsion polymerization within an aqueous medium and paint pigment particles are dispersed within the aqueous medium as a dispersed phase separate and independent from the binder latex phase. Both formulations would, of course, typically contain a variety of other additives for various purposes, mostly unrelated to this invention. The latex-based paint has the advantage of lower costs and better odor since solvents are absent, and easy clean up by simple water washing instead of organic solvents, and it is in the context of latex-based paints that the present improvement finds especially advantageous application.

Although modern paints have been much improved in stability against settling or flocculation of dispersed material therein by means of various stabilizing additives and advanced dispersing techniques, latex paints are inherently subject to settling and flocculation with consequential undesirable effects upon their properties. For example, virtually any latex paint will undergo separation of the dispersed phase from the continuous phase if subjected to centrifugation even for a relatively short time. Such centrifugation represents an artifically exaggerated condition accelerating the unsuitable effects of gravity over longer periods of time. Flocculation and settling of the pigment phase are particularly undesirable since they lead to the clinging together of the packed pigment particles into agglomerates or clusters that tend to resist subsequent redispersion by agitation and degrade the hiding power of the resultant paint.

The opacifying capability or hiding power of a latex paint, or for that matter virtually any paint depends mainly upon three factors. First, light absorption due to the inherent coloration of the pigment particles, which is of minor importance, and then primarily only for tinted or nonwhite paints; second, light refractance which is fixed for any given combination of binder and pigment; and third, light reflection and dispersion or scattering by the surfaces of the pigment particles in the eventual solidified paint film. Every latex paint has a minimum filming temperature, characteristic of its particular binder and possibly other constituents, which is the minimum ambient temperature at which the discrete latex particles or globules in a film thereof will colaesce together during drying so as to result in a solid binder film. The binder film is in itself essentially colorless, or water white in color, and serves then as the vehicle for holding the pigment particles dispersed therethrough. The net hiding power is determined particularly in a white paint essentially by the scattering effectiveness of the thus dispersed pigment layer which is in turn highly influenced by the regularity of the arrangement of the pigment particles in the layer as well as the regularity of the particle sizes themselves. The latter can to some extent be contained within acceptable limits by proper control of grinding and dispersing techniques but the former is dependent virtually entirely upon the relative disposition of the myriad pigment particles throughout the solidified binder layer. If the pigment particles are uniformly spaced apart an ideal distance, their light scattering power will be optimum as will be the hiding coverage of the paint. On the other hand, if the particle spacing is irregular and if pigment agglomerates are present that deviate considerably from the desired uniform pigment size, the light scattering will be degraded as will the hiding power. Various ways have been attempted in the paint field to achieve an optimum physical disposition of the pigment particles within a paint film including the use of so-called extender pigments which essentially function as mechanical spacing elements for the opacifying pigment particles so as to thereby produce a uniformly and properly spaced pigment layer with optimum light scattering and hiding power. However, flocculation forces are particularly acute during colaescence of the binder latex upon drying, promoting the creation of irregular clumps and clusters despite the presence of extender pigments.

It will be apparent that if a solid polymeric coating or envelope could be applied with controllable generally uniform thickness around discrete separate particles of a finely divided solid, such as a paint pigment, such an envelope could act to precisely determine the spacing between contiguous particles in the ultimate paint film, provided that a dispersion of such uniformly enveloped particles was stable against settling, reagglomeration or coalescence of contiguous coated particles. Such coated particles would for purposes of paint formulation offer further advantages of great importance. For example, deterioration in color, particularly of tinted paints is largely caused by the attack of light and air upon the pigment particles within the dried latex film which normally exhibits some degree of porosity as to allow access of atmosphere to the pigment particles it contains. If, on the other hand, the pigment particles were completely enveloped within a continuous polymeric coating, they would be shielded against contact with atmospheric air and at least to some degree protected against the photolytic effect of sunlight due to the reflecting quality of the polymer coating. Thus, not only would a latex paint, wherein at least a significant portion of the pigment component thereof was united with at least a significant portion of the binder phase into a composite dispersed phase in which each particle formed a core within a uniform polymeric envelope, offer the advantage of substantially enhanced hiding or covering power, that power would be retained for a substantially longer period of time than with conventional latex paints.

Again, conventional latex paint films rarely exhibit the "scrub" resistance, i.e., resistance to abrasion, of a good oil-base paint since the necessity for escape of water from the film during drying creates inevitable channels or pores therethrough which constitute points of structural weakness and the coalescence and coagulation of the latex phase particles cannot lead to proper envelopment of the pigment particles without voids and spaces therebetween. If, on the other hand, each individual pigment particle were completely enclosed within an envelope of the binder polymer, total integration of the pigment into the dried paint film results upon drying with greatly increased scrub and abrasion resistance.

Furthermore, it is commonly recognized that conventional latex paint films are subject to staining, both in the sense of absorbing extraneous colored matter from the environment as well as allowing chalking or the migration of pigment particles onto adjacent unpainted surfaces, such as housing foundations. Staining is due primarily to the porosity of the film which allows the pigment particles to absorb extraneous colored matter while chalking is caused in part by porosity. If, however, the pigment particles were totally enveloped in a polymeric coating, solid paint film containing the same would necessarily exhibit very substantially reduced staining and chalking tendencies.

In addition, one of the most difficult operations in paint formulation is the effective dispersion of the pigment particles into the paint system, requiring expensive complex grinding and milling equipment together with a formulary of dispersant additives and stabilizers which add significantly to the overall cost of making paint. If it were possible to prepare pigmented dispersions, particularly already carrying polymeric envelopes, without the necessity for such elaborate and prolonged treatment, there would result a substantial decrease in the cost of paint manufacture and thus the ultimate cost to the paint consumer.

With these compelling advantages so clearly foreseeable, it is not surprising that many attempts have been made in the art to develop techniques for the polymeric encapsulation of finely divided solids such as paint pigments. The following prior art may be mentioned to illustrate such attempts:

U.S. Pat. No. 3,068,185—preliminary treatment of clay particles to sorb on at least the surfaces thereof free radical generating addition polymerization initiating agent, e.g., by exposing the clay under vacuum to a gaseous atmosphere containing the initiating agent, followed by admixture to a water suspension of the thus treated clay particles at least one addition polymerizable unsaturated monomer in amount up to about 30% by weight of the clay and heating the mixture to effect polymerization of the monomer;

Canadian Pat. No. 714,113—mixing a pigment, water and cationic surface active agent to render the pigment hydrophobic, plus an organic phase containing a polymerizable monomer, to cause transfer of the pigment from the water to the monomer phase, and then effecting the polymerization of the pigment-containing monomer while dispersed in an aqueous medium;

U.S. Pat. No. 3,544,500—water soluble polymer is preliminarily absorbed on the surface of solid particles which polymer either includes hydrophilic polymeric chains, e.g., in grafted form, or has associated therewith a surface active agent having one end adapted to be anchored to the adsorbed prepolymer layer with the other end providing a steric stabilizing effect around the particles, then a monomer which is a swelling agent or solvent for the preabsorbed polymer is added and caused to undergo polymerization;

U.S. Pat. No. 3,714,102—a cationic charge is established on an aqueous dispersion of finely divided solid particles by acidification of the medium and adsorption of multivalent aluminum cations from a compound releasing such cations present in amount to decrease the viscosity of the dispersion, then a polymerizable vinyl monomer is added and caused to undergo polymerization with the aid of a free radical polymerization initiator, the weight ratio of total monomer to solid not exceeding about 2.5:1;

U.S. Pat. No. 4,421,660—inorganic particles, e.g., pigment particles, are passed through a high shear mixing device, e.g., a Waring blender, homogenizer or ultrasonic mixer (col. 4, lines 38–43, Examples 1–6) and monomer is polymerized in the resulting dispersion forming a very low percent solids latex (less than 30%, as low as 7.4%) which is not suitable for paints or adhesives unless concentrated, e.g., by vacuum distillation. The resulting latexes also contain substantial amounts of particles having an average particle diameter which is only a fraction of the average particle diameter of the pigment thus indicating the presence of substantial amounts of pigment-less polymer particles. There is no disclosure or suggestion in the Solc patent of the use of substantially nonionic polymerization conditions, including the use of nonionic surfactants, particles (e.g., pigment) substantially free of ionic charges, monomer capable of forming a polymer free of ionically charged groups, and an initiating agent which is free of strong anionic groups and does not decompose to form such strong anionic groups. By contrast, the present invention does not require high shear mixing, produces high percent solids latexes, produces latexes containing predominantly polymer coated pigment particles with little or no pigment-less polymer particles, and utilizes substantially nonionic conditions at least in the early and intermediate stages of polymerization.

While each of these techniques might conceivably have accomplished their intended purpose, it is obvious that none of them is well suited for execution on a commercial scale. In particular, those techniques which involve the generation of cationic charges on the finely divided particles create serious practical difficulties. The resultant latexes cannot, for example, be mixed with conventional latex paints since if so combined, either deliberately or accidentally, flocculation can result as a consequence of the anionic nature of the conventional latex, dependent upon the relative degree of polarity of the two latexes. This problem can frequently be avoided by very careful mixing of the two latexes but in this case, the water sensitivity of the ultimate dried film will suffer. Also, cationic paint systems even when dried cause rusting of ferrous materials in contact therewith which precludes the application of such coatings over exterior surfaces of iron or even having exposed nails or other iron fasteners since otherwise rust would quickly develop. It, therefore, is perhaps not surprising that insofar as I am aware up to the present time, the goal of a simple, direct and effective polymer encapsulation technique for solid particles remains an elusive one for the paint and other industries.

GENERAL SUMMARY OF THE INVENTION

In accordance with the invention, a water insoluble monomer polymerizable by appropriate initiation to a water insoluble polymer free of ionic groups, normally selected from among the vinyl type monomers, is added with mixing to an aqueous suspension medium in the presence of a nonionic surface active stabilizing agent, the medium containing or having then added thereto with mixing finely divided solid particles, e.g., a paint pigment free of surface charges thereon. A water soluble initiating agent is present in or added to the aqueous medium to initiate the polymerization of the monomer, preferably in gradual steps to maintain the polymerization rate at a manageable level until the monomer has been reacted. The novel latex-forming system of this invention, must be substantially nonionic, that is, it must be substantially free of strong anions or cations in the early and intermediate stages of polymerization, although such strong ionic groups can be added or formed during the final stages of polymerization or subsequent to completion of polymerization.

Although the behavior of the present system has not been fully rationalized, it appears that the nonionic surface active agent, consisting of strongly hydrophilic and hydrophobic groups, has its hydrophobic groups sufficiently strongly repelled by the aqueous medium as to become deposited upon or adsorbed superficially by the solid particles even though the latter are not necessarily or even particularly considered hydrophobic in the usual sense, while the hydrophilic groups extend into the surrounding margins of the aqueous medium. Given an adequate amount of surface active stabilizing agent present, the solid particles become surrounded by a sheath of oriented molecules of such agent, and it appears to be important to the achievement of good results that this sheath be essentially continuous over the particle surface and, furthermore, have substantially uniform thickness either as a monomolecular layer or as a multimolecular layer. For reasons that are not understood, but which again appear to involve preferential repulsion of the water insoluble monomer by the aqueous medium, monomer becomes attracted to and deposited as a layer upon the surfactant-sheathed solid particles, notwithstanding the hydrophilic nature of the sheath possibly by de-sorbing the surfactant molecules for migration to the interface of the monomer layer and the medium.

Upon initiation of the polymerization reaction, the deposited monomer begins to polymerize. As a consequence of this initial polymerization, and this is one of the remarkable effects observed in the present invention, flocculates or agglomerates in the original solid particles, which are impossible to avoid in practice, particularly since the solids used herein need not be thoroughly dispersed in the usual manner, become immediately and remarkably broken up and uniformly dispersed. This is believed due to the generation of heat by the polymerization, which is an exothermic reaction, localized at the surface of the particles which in effect "explodes" agglomerates apart into isolated individual particles. The system contains additional monomer dispersed therein and/or more monomer is added, and as the polymerization proceeds by further initiation, monomer migrates from the monomer particles onto the polymer coated solid particles with consequential growth of the polymer layer. Given solid particles relatively free of surface contaminants, the thus created polymer layer is surprisingly uniform over the entirety of the particle surface, following closely the contours of that surface and such uniformity can be more or less preserved during subsequent growth of the polymeric envelope, the ultimate thickness of which will be selected primarily according to the particular application of the polymer encapsulated particles.

DETAILED DESCRIPTION OF SEPARATE ASPECTS OF THE INVENTION

Reaction Medium

It is essential that the reaction medium be substantially aqueous in character in the sense of retaining substantial polar character relative to the nonpolarity of the polymerizable monomeric component present. Generally in practice, this will mean the selection of an entirely aqueous reaction medium which preferably, as is well known in the art of emulsion polymerization generally, is deionized so as to be free of ions of metals and other contaminants which could lead to undesirable consequences. It would presumably be acceptable, depending upon the hydrophobic strength of the monomeric component, to include minor amounts of water-miscible organic liquids, such as the alcohols, particularly the lower alcohols, provided the medium remains strongly hydrophilic relatively to the hydrophobic monomeric component, but such alcohols act as chain transfer agents terminating the polymerization and yielding lower molecular weight polymers. With aqueous media free of such diluents, high molecular weight polymer formation is promoted which is normally advantageous.

Monomeric Component

Broadly speaking, virtually any monomer capable of undergoing addition polymerization in emulsion form to produce a polymer free of ionically charged groups is at least in principle useful in the present invention, but for virtually all practical purposes, the present monomers are selected from among the so-called vinyl monomers, including vinylidene and acrylate monomers, which are substantially water insoluble and which polymerize to substantially water insoluble polymers free of ionic groups. The requirement of water insolubility does not dictate absolute insolubility in water since useful monomers, and indeed some preferred monomers are characterized by a low degree of water solubility, say up to about 3% or so. Typical useful monomers thus include the following, to mention only a few: vinyl monomers, such as vinyl acetate, vinyl chloride, vinylidene chloride, acrylonitrile, methacrylonitrile, vinylidene cyanide, styrene, alpha-methyl-styrene, vinyl benzene, isobutylene, vinyl toluene, and divinyl benzene plus various vinyl ethers and ketones, the acrylic and methacrylic esters such as methyl acrylate, n-butyl acrylate, isobutyl acrylate, methyl methacrylate, ethyl methacrylate, n-butyl and isobutyl methacrylate, and olefins, such as ethylene, propylene, butene, 1-hexane and butadiene, etc. Monomers such as acrylic or methacrylic acid which give polymers giving ionic groups, i.e., carboxyl groups, are not acceptable for this invention. Combinations of plural monomers are entirely permissible or even desirable so as to form co- or terpolymers which by virtue of the combination of proportions of monomers conferring significantly different properties, make possible a tailoring of the overall properties for the polymeric coating between the extremes represented by the individual components themselves. Different monomers can be polymerized in superposed layers, following the known core and shell principle, so as to again achieve special effects such as, for example, the provision of hard, thin exterior shell around a soft, thick polymeric layer which might have peculiar value for adhesive purposes.

The selection of particular monomers will depend upon the end use of the ultimate encapsulated material and, obviously, not all of the monomers listed above will be equally suitable for all end uses. For example, styrene is unsuitable as the sole binder for a paint composition, as is methylmethacrylate under most conditions, due to excessive hardness and brittleness causing a film thereof to crack and break apart. However, styrene is useful for other purposes where hardness is a virtue, and styrene in any case is very desirable for copolymerization with one or more monomers forming softer polymers. Similarly, some of the monomers mentioned above form polymers which are relatively soft such as vinylidene chloride and n-butylacrylate and would not, therefore, be well adapted as a paint binder unless copolymerized with other harder monomers such as styrene or methylmethacrylate. On the other hand, for purposes of an adhesive, the softer monomers might be more desirable.

The monomers can, of course, be substituted with a variety of substituents including any substituents known with monomers employed in conventional emulsion polymerization which do not introduce ionic groups or interfere with the polymerization mechanism.

Monomers that form water soluble polymers are not useful here as the exclusive monomeric component or, alternatively, as the exterior component of a multi-component system since such polymers, although they appear to deposit upon certain types of particles but not upon all types, lead to flocculation and agglomeration of the thus coated particles which tend to stick together due to the sticky water-swollen coating thereon. However, water soluble polymers can be applied if followed by the application of a compatible polymer coating which is sufficiently water insoluble. However, up to now, no significant benefit has been found in the preliminary application of a water soluble polymer since it appears neither to facilitate the envelopment of difficulty treatable particulate solids nor to promote the subsequent deposition of the exterior water insoluble polymeric component. The only reason now perceived for the possible inclusion of a water soluble monomer would be with other monomers as part of a co- or terpolymeric system having water insoluble properties, functioning in such a system, for example, as a coupling unit between otherwise incompatible monomeric components.

The Finely Divided Solid Particles

As presently understood, virtually any solid particulate matter, including the usual variety of natural and synthetic pigment materials, qualify for treatment by the present method, provided that such particles are free of significant levels of ionic charge, either anionic or cationic, existing either from their structure or generated during their preparation and handling through electrolyte additions. Particles which are charged have been found not to participate in the present encapsulation mechanism but, in fact, to severely inhibit the same, resulting in virtually immediate flocculation of the entire solids into mass resembling cottage cheese or worse. This strong inhibiting action has been found to occur, for example, in the attempted treatment of pigment particles subjected to preliminary dispersion in the usual way with conventional strongly anionic dispersing aids, e.g., polyphosphates, or when an anionically charged agent, such as a strongly anionic surface active stabilizing agent of the type such as alkali metal alkyl sulfates commonly utilized in conventional emulsion polymerization, is added to or substituted for the nonionic stabilizing agent of the present invention.

Titanium dioxide is of special importance in the paint field for the production of white paints, either for use as such or as the base for subsequent tinting, and which constitutes a major volume of commercial paint production. As manufactured, titanium dioxide exhibits certain undesirable properties from the standpoint of its utilization in conventional paint manufacture, being difficult to maintain in suspension and susceptible to excessive chalking when used in exterior finishes and, consequently, through the years titanium dioxide manufacturers have developed surface treatments for their product to improve these and other properties. Such treatments include the addition to the regular titanium dioxide of metal and metaloid compounds such as aluminum oxide, silicon dioxide, and zinc oxide to mention the most common, and such treatment compounds can be incorporated in varying amounts up to about 20% and in various ways so as to suit the needs of particular paints destined for particular purposes. Many of these treatments are proprietary in nature and precise descriptive information concerning the same is difficult to obtain, the commercial grades of the treated product usually being merely designated by its content of titanium dioxide with a general identification of the additive.

Paradoxically, these treatments for modifying titanium dioxide to improve their behavior in conventional paint systems prove to have quite the opposite consequences in the inventive system, resulting in inferior encapsulated products. This does not mean that such treated titanium pigments, even heavily treated ones, cannot in principle be encapsulated following the steps of the invention but rather that the resultant encapsulated product exhibits relatively poor properties compared with other untreated pigments and the behavior of the treated pigments tends to vary widely from batch to batch. It appears that these chemical treatments of titanium dioxide are far from uniform considered either as a whole from batch to batch, or within a given batch in their effect upon the surface of the titanium dioxide particles. Thus, the deposition of the treatment compound upon the titanium dioxide particles is not uniform, perhaps due to the incomplete initial coverage or breakdown during grinding of initially covered larger particles into smaller particles with uncovered areas or other reasons, and the extent of such nonuniformity with its consequential influence on the progress of the polymerization reaction during evaporation is impossible to predict among various batches of presumably identically treated titanium pigment. If the surface treatment could be applied uniformly over the titanium pigments or if a monomeric component, including plural monomers if need be, could be formed that was equally compatible with the titanium dioxide base material and the surface treatment material, then encapsulation by the present method should proceed satisfactorily.

For example, equivalent dried paint films containing equal amounts of comparably encapsulated treated and untreated titanium dioxide can show extraordinary differences in hiding power, the values obtained from treated pigment being 50% less than that obtained from minimally treated pigment. This behavior can be explained by unevenness of the polymeric envelope around the treated titanium pigment particles which results in nonuniform spacing of these particles in the dried paint film and consequential reduction in light scattering and hiding power. On the other hand, the benefits of the invention in obtaining highly uniform dispersion of the treated pigment particles and of imparting high stability to the resultant latexes are as evident with the treated materials as with the untreated ones. Obviously, where a paint is to be formulated, it becomes advantageous to select a titanium pigment with minimum chemical treatment, preferably as close to 100% titanium dioxide as possible. With these preferred pigments, encapsulation according to this invention makes possible as much as a 50% reduction in the content of prime pigment to obtain the same degree of hiding power in the paint produced therefrom.

While for use in white paints, titanium pigments are much preferred, other pigments such as antimony oxide and zinc oxide have value for this purpose and can be treated equally well by this invention. Other pigments which have a relatively low refractive index compared to that of the usual polymeric binders with little or no light refraction and consequential weak light scattering power, such as barytes, whiting, talc, China clay, mica, calcium carbonate, and the like are often incorporated in paints for other reasons, such as fillers, extenders, flatting agents, reinforcement, etc., and can be advantageously encapsulated for these same effects. Certain pigments have acicular (i.e. needlelike) or lamellar (i.e. platelike) shapes and thus have poor hiding power in a paint film but can serve well for other purposes such as reinforcement as mentioned. Colored pigments, mostly organic in nature, are entirely suitable for encapsulation and inasmuch as complete information as to the identities and sources of the myriad variety of such pigments available in the field is provided in *The Raw Materials Index* published periodically by the National Paint and Coating Association, Inc., Washington, D. C., no attempt will be made to list examples of this kind of material. General classes of organic pigments from which specific pigments can be selected for use here include the following: Insoluble azo, anthraquinone, Indigoid, phthalocyanine, basic, as well as more modern types such as those obtained from the du Pont company under the trade name Monastral. Helpful general information regarding the selection of specific organic pigments can also be found in *Organic Coating Technology* by Payne, Volume 2, John Wiley & Sons, Inc., copyright 1961, chapter 20, pages 853 et seq. Obviously, the selected pigment must be substantially water insoluble and must not interfere significantly in the polymerization reaction. Some pigments, particularly those containing aluminum or iron, such as iron oxide, may require adjustment of the suspension medium pH to avoid possible adverse reaction but with such adjustment are entirely satisfactory. So-called "reactive" pigments such as zinc oxide, already mentioned, cause no problems when used in this method.

Nor is the invention limited to materials generally considered to be pigments; rather it extends to other types of finely divided particulate matter that may have very different utility. Thus, it is possible to encapsulate particles of sand, clay, glass beads, short glass fibers, beads of various metals, such as iron, steel, brass, titanium, cobalt, nickel, gold, platinum, chromium, zinc, palladium, silver, ruthenium, platinum, rhodium, or copper or the like and oxides thereof, to specify just a few. Some particulate solids, such as calcined clay, zeolites, diatomaceous earths and the like are characterized by a more or less highly porous structure providing a high volume of interior spaces. While such materials can be processed by this invention, during the reaction, the monomer deposits and polymerizes equally on the interior and exterior surface areas thereof and the amount of polymer within the interior areas is wasted as far as making any contribution to the binding action of the polymer is concerned. In addition, the primary function of these materials as paint pigment is to increase dry hiding power due to air held in their pores and as this air is displaced by the polymer, this function is defeated. Of course, for other purposes where total coverage of the surface area, both interior and exterior, of porous materials is advantageous for a particular end use, for example, in withstanding attack from an otherwise corrosive environment, porous materials may be quite useful.

The size of the particulate matter to be encapsulated may vary widely. Colored organic pigments as a group tend to have extremely small particle size in the order of 0.01 microns average and can be processed effectively with the proviso that because of the enormously increased surface area of extremely small pigment particles, larger amounts of surfactant and/or monomer will normally be required in order for the latter to deposit over the entire surface area of such particles. Indeed, the invention may be specially suitable for the treatment of such extremely finely divided matter which because of the enormous surface forces arising from the increased surface area exhibit a strong natural tendency toward the formation of agglomerates which tendency is overcome in the course of the polymerization, as will be explained further. Larger particles with lesser surface area are easier to put into good suspension and can hence be processed more easily. As regards the upper size limit, there appears to be no maximum other than that imposed by practical considerations; namely, the creation of a generally uniform suspension within the medium. Thus, particles in the order of several hundred microns or even larger could be treated without difficulty. By way of illustration of the typical size of preferred pigments, titanium pigments usually average about 0.2 microns, calcium carbonate particles are somewhat larger in the range of 0.5-60 microns, while carbon black runs about 0.01-0.05 microns, and sizes of this magnitude respond equally well to the present treatment.

To avoid confusion or misunderstanding, it should perhaps be mentioned that virtually all natural pigment material can be expected to carry some small amount of charge thereon, especially when dispersed in water, which would usually be anionic in character but as is apparent from the above description and the working examples to follow, such small natural background charge levels impose no difficulty in the execution of the present process, and in the above general characteristics of operative particulate material, the term "significant" is deliberately employed so as to encompass such small insignificant levels of background charge while excluding high levels of charge which are not contemplated within the scope of this invention.

THE NONIONIC STABILIZING AGENT

A critical feature of the present invention is the generation around the finely divided solid particles suspended in the reaction medium of a steric barrier or sheath that persists during the course of polymerization reaction by means of a nonionic stabilizing agent which adsorbs on the surface of the particles and does not contain any ionic groups, either cationic or anionic. It is known in conventional emulsification polymerization as well as in the suspension of paint pigment particles in the preparation of paint compositions to create around the particles, either latex or pigment, an electrostatic barrier constituted by a cloud of electrostatically charged ions of a given polarity which, due to the repulsive effect of like charged particles, exerts a dispersing action on the suspended particles which tends to stabilize the resultant suspensions. Typical compounds used for this purpose for pigment are strongly anionic polyelectrolytes, such as sodium tripolyphosphates or other so-called molecularly dehydrated phosphates, and for latexes, strongly anionic emulsifying agents, such as sodium lauryl sulfate. Such stabilization by electrostatic charges carried by ionic groups is not acceptable in the present invention, resulting in highly undesirable and strong flocculation of the polymer and particulate matter together into a more or less solid mass. For example, if conventional emulsion polymerization using an anionic emulsifying and stabilizing agent is attempted to be carried out in the presence of a dispersed phase of solid particles, the polymerization is essentially like bulk polymerization, resulting in the solids of the system flocculating or setting up within a few seconds or less into a mass varying in consistency from cottage cheese to a lumpy dough to a sticky plastic, any of which are entirely worthless for any practical use.

It has been found, quite surprisingly in the light of this experience, that if the anionic emulsifying and stabilizing agent is replaced in entirety with a nonionic stabilizing agent of sufficient hydrophilic-lipophilic power as to possess good emulsifying action, the added monomer present deposits or is adsorbed preferentially on the particle surfaces and polymerizes exclusively upon the surface of the solid particles present, at least in the absence of a large excess of nonionic stabilizing agent, forming a polymeric envelope around the particle surface that is remarkably uniform in thickness. The result is a suspension of polymeric encapsulating solid particles having extraordinary stability against flocculation or settling compared with conventional latex systems.

The nonionic stabilizing agent of the invention is by definition free of ionically charged groups and does not dissociate into such groups upon solution in the aqueous medium. In order to exert a sufficiently high degree of dispersing action, it is considered that this agent needs to have a so-called HLB number of at least about 13. As is well known in the surfactant field, it is possible to determine empirically, as well as to estimate or approximate by calculation, the surface active strength of a given agent, which strength is referred to as the HLB number. To be effective here, the nonionic stabilizing agent should have an HLB number of at least about 13 up to 20 or higher. Conceivably nonionic surfactants with somewhat lower HLB numbers than 13 could be employed with less efficient results, particularly if their suspending power was augmented by the addition of a protective colloid or thickening agent, e.c. polyvinyl alcohol, hydroxyethylcellulose or the like, which, as is known in the field of emulsions are able to enhance or strengthen the protective barrier created by surface active agents around dispersed phase globules or particles, but for most practical purposes, a minimum HLB number of 13 is indicated so as to avoid any necessity for a protective colloid.

There exist a variety of nonionic surface active stabilizing agents which have HLB numbers of about 13 or higher and these can be identified by resort to any text relating to emulsions: Emulsions: Theory and Practice by Becher, 2nd edit., Reinhold Publishing Corp., especially at pages 235–238, or surfactant handbook such as *McCutcheon's Detergents and Emulsifiers*. Any nonionic surface active agent meeting the above criteria would presumably be suitable for use in the present invention but, as a general rule, these agents will be polyethoxylated derivatives of various hydrophobic groups, including poly-ethoxylated esters of fatty acids, and polyethoxylated ethers of fatty alcohols and alkyl-substituted phenols or the like having a sufficient carbon chain length as to impart adequate hydrophobic power, for adsorption upon the particle surface generally at least about 8 and preferably 12 or more, the phenyl group being equivalent to a carbon chain of 4. The number of carbon chains in the hydrophobic chain can, of course, go much higher to include virtually any of the available fatty acids and fatty alcohols as the hydrophobic group.

The number of ethylene oxide (EtO) groups in the polyethylene oxide chain can vary from about 10 up to 200 or more and it is preferred to have at least 40 to 50 EtO groups up to about 150. A particularly preferred stabilizing agent is an octyl- or nonyl-phenol polyethyloxylate containing 50 to 150 EtO groups.

To illustrate the relationship between the number of EtO groups and the HLB number, a polyethoxylated nonyl-phenol with 10 EtO groups has an HLB number of 13, with 50 EtO groups, and HLB number of 18, and with 100 EtO groups, and HLB number of 19. The analogs of such alkyl phenol derivatives derived from fatty alcohols or fatty acids of equivalent carbon number could be substituted with equivalent effectiveness in the present method. It does not appear to be required that the hydrophilic chain be constituted exclusively of EtO groups provided the requisite minimum HLB number is achieved by the selected surface active agent; however, as a practical matter virtually all such agents available with an HLB number of this magnitude do depend upon ethylene oxide chains for their hydrophilicity.

It is extremely difficult to specify precisely the amount of the nonionic surface active stabilizing agent that is needed in the practice of this method inasmuch as the amount of the agent required to deposit around a suspended phase of solid particles is basically determined by both the particle size and the number of particles present, the multiple of which gives the aggregate surface area present which has to be covered by adsorbed stabilizing agent so as to form a steric barrier around each such particle. For example, for particles varying in mean diameter merely from 0.007–0.07 micron, which is only a fraction of the size range possible in the invention, there is a 50-fold variation in surface area from about 1,000 to about 23 square meters per gram. It is certain that with the very finely divided pigment particles, such as carbon blacks or precipitated calcium carbonate with a size in the order of 0.01 micron, the amount of surface active agent must be increased considerably if effective stabilizing action is to be achieved. Broadly speaking, the amount of stabilizing agent will fall within the range of about 0.5 to about 20%, and more usually 1-10%, of the total weight of the monomer and solid particles present, the lower end of the broader range being applicable to large sized particles, such as fibrous talc, while the upper end applies to the very fine particles of the type just mentioned.

Furthermore, the amount of the surface active stabilizing agent is affected by the existence of an equilibrium concentration of that agent between the aqueous medium and the dispersed phase. Thus, as the solids content of the system is varied, appropriate adjustment needs to be made in the amount of stabilizing agent employed in the initiation stage so as to achieve an optimum equilibrium concentration. For example, if the solids content of a given system is reduced to give a more dilute condition, then more of the stabilizing agent needs to be present to maintain the needed equilibrium concentration in the greater volume of suspending medium.

The ultimate indication or test of a proper armount of nonionic surface active stabilizing agent is the actual production of a suspension of polymer-encapsulated solid particles having strong stability against flocculation or settling. Various instruments and procedures are known for determining the stability of suspensions and any of these is in principle suitable here. However, the most widely accepted test in actual practice is the so-called "hand rub" test in which a small amount of the suspension is placed in the palm of one hand and is rubbed or spread out with the fingers of the other hand in a circular motion. If the emulsion spreads smoothly and uniformly with a cream-like feeling, it has good stability; whereas, if it coagulates or flocculates into lumps, then the suspension is clearly unstable. Once a suspension has been found to be in a de-stabilized condition, this condition cannot thereafter be corrected by adding more or less stabilizing agent or any other reaction ingredient. If as preferred the polymerization is carried out in stages, i.e., an initial stage in which a higher fraction, say about 5-10%, of the monomer is caused to undergo an initial polymerization and further amounts of monomer are thereafter fed gradually or step by step together with corresponding amounts of polymerization initiating agent so as to continue the polymerization, then as a general rule the initiation stage is the more critical as regards stabilization and a sample of the reaction product is desirably tested at the end of the initiation stage. If de-stabilization has already occurred, the reaction mass must be discarded and a new reaction procedure set up with appropriate adjustments in the amounts of stabilizing agent, and possibly other ingredients, as dictated by the results of the original run and one's experience in the process.

THE POLYMERIZATION INITIATING AGENT

The polymerization reaction involved in the present invention is initiated and maintained with an initiating agent or catalyst, as it is sometimes referred to, which is generally similar to those employed in conventional latex polymerization except that the most commonly used conventional initiating agent; namely, the persulfates, are not acceptable for use here. It appears that persulfate type initiators are either highly anionic or decompose during the polymerization reaction into decomposition products which are highly anionic and cause severe inhibition of the deposition of the polymer upon the pigment particles, resulting in an uncontrolled polymerization leading to flocculation and gelation of the entire body of solids. The initiating agent comprises an oxidant and any of the usual peroxides and hydroperoxides serve very well including hydrogen peroxide, n-butyl hydrogen peroxide, cumyl hydrogen peroxide, benzoyl peroxide and the like. As with any initiating agent, the peroxides decompose or disassociate on addition to water, generating free radicals which then activate the polymerization of the monomer in accordance with well-known principles of addition polymerization. The disassociation of these compounds is a function of temperature and higher temperatures are desirable in increasing the rate of initiation. However, in practice, the disassociation rate of these compounds even with heating is undesirably slow, and it is thus desirable to include a reductant to accelerate the initiating effect of the above oxidants. Typical reductants include sodium formaldehyde sulfoxylate and compounds releasing ferrous or ferric ions, with the proviso that the amount of free ferrous or ferric ions released is not sufficient to react with and consume all of the peroxide oxidant through formation of ion hydrates. Other recognized oxidants are azo and diazo compounds, for example, alpha, alpha'- azo diisobutyronitrile and other common reductants include the water soluble sulfides, bisulfides, and hydrosulfides, such as sodium bisulfite.

It will be obvious that the oxidant and reductant together constitute a redox system and, the term "polymerization initiating agent" as employed here is intended to cover such redox systems as well as in the use of the oxidant alone when appropriate.

The amount of the initiating agent employed follows generally the practice in conventional emulsion polymerization which is ordinarily initiated in the same manner. In general, the amounts of each of the oxidant and reductant can vary within the range of about 0.25% up to 3 or 4% or possibly higher by weight of the total monomer, it being generally recognized that higher levels of initiating agent tend to result in lowered molecular weight for the ultimate polymer. Preferably, the oxidant is introduced into the reaction vessel before the reductant since if the reductant were to be added first without purging the reaction vessel free of oxygen, the reductant reacts with extraneous oxygen present and is unavailable when the actual oxidant is introduced. Similarly, the oxidant and reductant should not be mixed together before introduction to avoid premature reaction and loss of effective oxidant. The amount of initiating agent is also influenced to some extend by any condition which tends to inhibit the polymerization reaction, more of the initiating agent being required in order to overcome such inhibition.

If the polymerization is carried out in multiple stages, the amount of initiating agent in the beginning or initiating stage is adjusted to match the proportion of the monomer then present, and further initiating agent is fed during the delayed feed stage to correspond to the delayed feed of the monomer. Basically, in any case, the initiating agent is supplied as needed to maintain the reaction in a smooth and easily controlled condition.

REACTION CONDITIONS

Generally speaking, the reaction conditions employed in the execution of the present method parallels those utilized in conventional emulsion polymerization as regards such variables as temperature, time, agitation, equipment, etc. The starting temperature, at which the oxidant is added, is usually around 50° to 55° C. and as the reaction proceeds exothermically, the temperature rises. It is preferred to control reaction temperature during the exothermic phase to around 65°–70°, plus or minus a few degrees. Higher temperatures are possible, e.g., up to 80°–90° C., as is known in conventional emulsion polymerization, but tend to result in chain branching of the polymer and crosslinking and are usually less desirable. At these higher temperatures, some monomers, such as vinyl acetate, are above their boiling points and undergo refluxing which tends to be undesirable in removing monomers from the actual reaction site and favoring homopolymerization.

The time of the reaction is difficult to predict since it will depend upon other variables, such as the amount of initiating agent introduced, the reaction temperature, etc. If the amount of monomer is small, the reaction may be finished within about an hour but with larger amounts, say a 1:1 monomer/pigment ratio or higher, the reaction will usually continue for 3 to 4 hours, about half the duration of the usual conventional emulsion polymerization including ½ to 1 hour of post-heating stage after all monomer has been added so as to insure that the polymerization has gone to completion and no free monomer is present.

The sequence of addition of the various ingredients is not critical and can be varied. Usually, aqueous medium is first added to the reactor, then the nonionic stabilizing agent, particulate matter and monomer in that order, all being added while the medium is thoroughly agitated, followed by the oxidant and finally the reductant, but other sequences are possible. As the particulate matter is introduced into the medium before the surfactant, it may not be well dispersed within the medium but the quality of the dispersion improves when the stabilizing agent and monomer is added. Some agglomerates normally will still remain but will be separated before, during and after to initiation of polymerization.

The agitation is similar to that applied in conventional emulsion polymerization using preferably a turbine type impeller rotating around 200–300 rpm under lab conditions and at considerably slower speeds say about 50 rpm or so, under plant conditions. High shear mixing is neither needed nor desirable.

An important feature of the present invention is the wide variation in the relative amounts of monomer to particulate solids that is possible, including ratios of monomer/particles which are much greater than the capability of other methods of encapsulating solid particles. Good results are obtained at monomer/particle ratios of about 10:1–1:10, influenced to some extent by the type and particle size of the solid matter being treated. Thus, for very fine particle sizes, larger amounts of monomer are desirable; while, conversely, small amounts of polymer are suitable for encapsulating larger particles. The minimum amount of monomer cannot be easily specified since it will be that amount which is necessary to form a monomolecular polymer envelope around the given particles, which is solely dependent upon surface area but such amount is calculable from known equations. In addition, the nature of the application of the final material will affect the proper amount of monomer. Except for very fine particle sizes, 5% monomer by weight of particle solids will be effective, especially for very large-sized materials, and perhaps even lower levels of monomer would be useful in such cases although not for finer particles. The upper limit possible for the monomer will only be limited by practical considerations, again determined by particle size, being reached when the encapsulated particles have grown so large as to completely fill the available space.

Important Features of the Invention

The product of the present encapsulation method is a creamy suspension of encapsulated particles which is either white or colored (if the particles are colored) and is characterized by an extremely strong stability or resistance to flocculation. For example, products formulated within reasonable limits of the ranges described are almost impossible to separate by high speed centrifugation at several thousand rpm or so for several hours and usually exhibit no perceptible selting or syneresis; they are stable against settling on shelf storage for many months. In contrast, a conventional polymer latex or latex paint will separate under the same conditions of centrifugation within a few minutes. At very low levels of monomer with certain pigments, such as 5% monomer for calcium carbonate, a slight syneresis may be observed after a few days shelf storage but the product is nevertheless readily redispersable with agitation into a fully uniform suspension.

One of the surprising aspects of this invention is the inherent strong dispersing effect that is exerted upon the almost inevitably present agglomerates and clusters of pigment particles during the initiation of the polymerization reaction. Following the course of the reaction by light microscopic inspection of periodically withdrawn samples, this phenomenon can be readily observed. Before polymerization, the solid particles will be seen as small agglomerates or clusters of varying sizes but upon the initiation of polymerization, these clusters seem in effect to "explode" apart so that individual solid particles now carrying a very thin envelope of polymer will appear as fine points of light scattered uniformly throughout the medium until all of the particle agglomerates are broken down after a few, say 5 minutes or so. This in-situ dispersion action is an important advantage and makes unnecessary the usual lengthy and cumbersome dispersing manipulations ordinarily required in preparing pigment dispersions for incorporation in a paint and like coatings.

Although, as already mentioned, changes in the initial proportion of the aqueous medium will influence the amount of nonionic stabilizing agent required for effective processing, once the polymerization reaction has been completed and a suspension of acceptable stability achieved, the system has high tolerance for further dilution with water as may be needed to adjust the solids content to a desired level.

As noted above, compounds which are strong anionic or cationic surface active or dispersing agent cannot be present in the present method at the beginning of or during the polymerization reaction. It is preferable, also, that the entire polymerization reaction system be substantially free of strong anionic or cationic materials and materials that form strong anions or cations at the beginning of or during the major portion of the polymerization reaction. However, once the polymerization reaction has been fully completed and a stable suspension produced, such compounds can be added without serious impairment of desirable product properties or, alternatively, the present products can be combined with conventional latex paints, especially those which are anionic in nature, without encountering problems.

If desired, with sufficiently hydrophilic pigments such as China clay, talc, or titanium dioxide treated with aluminum silicate or alumina, it is possible to apply by this method an initial coating of a water soluble polymer, such as polyvinyl pyrrolidone, followed by the application of an exterior envelope of a water-insoluble polymer by the procedure described above. This variation is not, however, applicable to more hydrophobic pigments, such as calcium carbonate, silica, or silica-treated titanium dioxide pigments, and if an attempt is made to apply a preliminary envelope of a water soluble polymer to the latter pigments, the entire system can undergo coagulation. While this option of initially coating hydrophilic particles with a water-soluble polymer is available, up to now no benefit or advantage has been found for pursuing it since it does not simplify or promote the formation of the ultimate water-insoluble polymeric envelope and does not appear to aid any other aspect of the procedure.

When a preliminary coating of water-soluble polymer is used, it does not alter the viscosity of the medium since the water-soluble polymer deposits preferentially upon the particles and is subsequently completely overcoated by the exterior water insoluble polymeric envelope, notwithstanding the fact that in the absence of a suspended phase of solid particles, polymerization of vinyl pyrrolidone under the same conditions would result in the water soluble pyrrolidone polymer dissolving in the aqueous medium and increasing its viscosity.

The usual additives or adjuvants for polymerization and/or stabilization in conventional emulsion polylmerizations can ordinarily be employed here except as otherwise specified. Thus, any of the usual protective colloids, such as polyvinyl alcohol, hydroxyethyl cellulose, casein and the like, can be incorporated in the amount of about 1-5% by weight of solids to augment the stabilizing power of the non-ionic stabilizing agent and often permit a reduction in the amount of such agent needed to accomplish good stabilization. Similarly, small amounts of organic and inorganic acids, such as acetic, hydrochloric or sulfuric acid, can be added to adjust the pH to the optimum point for the polymerization reaction. In like manner, the additives, aids and adjuvants usually incorporated in the ultimately formed paints or coatings, can be incorporated here such as rheology-modifying compounds, including those carrying ionically charged carboxyl groups, typical thickening agents including carboxymethyl cellulose, glycols for increased freeze-thaw resistance and wet-edge retention, various wetting agents to improve substrate rewettability, defoamers, filming aids to reduce the polymer softening temperature, and so on.

In summary, the microencapsulation process according to the present invention offers, among others, the following advantages:

(1) It is carried out in an aqueous medium,
(2) It requires no pre-dispersion or other pre-treatment steps for the solid particles,
(3) It involves conventional emulsion polymerization conditions,
(4) Monomers commonly employed in the coatings industry can be utilized,
(5) A wide variety of pigments and similar materials can readily be encapsulated,
(6) Polymer to pigment ratios can range at least from 1:10 to 10:1,
(7) Under any reasonable conditions 100% sheathing efficiency is achieved, and
(8) The number and complexity of the operational steps are no greater than those normally required in conventional latex manufacture.

EXAMPLES

EXAMPLES 1-3

Examples 1-3 illustrate the extremely simple nature of the basic method of the present invention, permitting it to be carried out with quite primitive and meager equipment.

Example 1

| Initial Charge | Ingredient | Wt (gms) |
| --- | --- | --- |
| Medium | Tap water | 100 |
| Stabilizing Agent | Polyethoxylated nonyl phenol, 100 EtO, 70% aq. sol., Igepal CO-997, GAF | 6 |
| Particles | China clay, 0.5 micron, ASP-170, Engelhard | 50 |
| Monomer | N—vinyl-2-pyrrolidone, GAF | 10 |
| Protective Colloid | None | — |
| Delayed Feed: | | |
| Monomer | Mixture: Vinyl acetate | 32 |
| | n-butyl-acrylate | 8 |
| Polym. Initiator: | | |
| Oxidant | t-butyl hydroperoxide (t-BHP), 70% aq. sol. diluted 1.3 parts in 5 parts water | as needed |
| Reductant | sodium formaldehyde sulfoxylate (SFS) solution 1.3 parts in 8 parts water | as needed |

The initial charge ingredients are added to 1 liter, tall-form beakers or equivalent vessels while agitation is maintained using a "Lightnin'" type stirrer with a three-blade impeller or equivalent. The reaction vessel is heated with a hot water bath while the temperature of the charge is monitored with a long stem mercury thermometer having a scale from 0°-100° C. A small amount, say ½ cc, of the oxidant is added to the initial charge and heating is continued until the charge mixture has reached approximately 55° C. at which point an equivalent amount of the reductant is added with immediate initiation of polymerization of the initial monomer. The polymerization reaction is exothermic so that the water bath heating can be discontinued and the reaction temperature rises quickly to about 70°. When the reaction decays as indicated by a drop in charge temperature to about 65°, a metered amount of the delayed feed monomer, say about 10 ml and about 0.5 mil of each of the oxidant and reductant are introduced in that order by means of a hypodermic syringe or equivalent, such introduction being accompanied by a drop in charge temperature to about 60° due to the cooling of the monomer at which point the polymerization reaction is reinitiated with a consequential temperature rise to about 70° C. When the injected portion of delayed feed monomer is polymerized, the reaction temperature again decays to about 65° C. at which point similar fresh amounts of monomer and oxidant and reductant are added to repeat the cycle until the total amount of delayed feed monomer has been introduced and polymerized. With such an open vessel experiment, care must be exercised to avoid inhalation of monomer vapors which in some instances are known to be carcinogenic and ideally the experiment can be carried out under an exhaust hood as a protective measure. When, as in this example, the reductant is sodium formaldehyde sulfoxylate, the solutions thereof should be fresh and pure with absolute clarity since even slight turbidity, which can develop with aging, may result in undesirable foam formation in coating applications.

EXAMPLE 2

| Initial Charge | Ingredient | Wt. (gms) |
|---|---|---|
| Medium | Tap water | 100 |
| Stabilizing Agent | Polyethoxylated nonyl phenol, 50 EtO, 70% aq. sol., T-Det-N-507, Thompson Hayward | 5 |
| Particles | Titanium dioxide, 0.2 micron, Ti-Pure R-960, du Pont | 40 |
| Monomer | N—vinyl-2-pyrrolidone, V-Pyrol, GAF | 6 |
| Protective Colloid | Hydroxyethyl cellulose, CELLOSIZE QP-300, Union Carbide | 0.5 |
| Delayed Feed: | | |
| Monomer | Mixture: vinyl acetate | 41 |
|  | isobutyl acrylate | 13 |
| Polym. Initiator: | | |
| Oxidant | t-BHP solution 1.3 parts in 5 parts water | 6.3 |
| Reductant | SFS solution 1.3 parts in 8 parts water | 9.3 |

EXAMPLE 3

| Initial Charge | Ingredient | Wt. (gms) |
|---|---|---|
| Medium | Tap water | 100 |
| Stabilizing Agent | Polyethoxylated nonyl phenol, 100 EtO, 70% aq. sol, T-Det N-1007 Thompson Hayward | 5 |
| Particles | Talc, 6 micron. R. T. Vanderbilt Co. | 20 |
| Monomer | Vinyl acetate | 10 |
| Protective Colloid | None | — |
| Delayed Feed: | | |
| Monomer | Vinyl acetate | 70 |
| Polym. Initiator: | | |
| Oxidant | t-BHP solution 1.3 parts in 5 parts water | 6.3 |
| Reductant | SFS solution 1.3 parts in 8 parts water | 9.3 |

Example 1 is repeated using talc as the particle material to be encapusalated.

The result of each of Examples 1–3 is a stable suspension of encapsulated particels in water similar in appearance to a conventional latex. These suspensions were evaluated by crude staining tests in which dried coatings of the same were prepared and contacted with materials known to have high staining propensity; namely, mustard, ketchup, grape juice, and chocolate syrup, and all were found to be highly resistant to staining from any of these materials. Samples of these suspensions were examined by electron microscopy and no evidence could be found of the formation of any separate polymer particles which if present would be readily discernible by a distinctive shape; whereas, all particles observable in these tests conformed to the shape of the original pigment particles.

EXAMPLES 4 and 5

Examples 4 and 5 illustrate the practice of the present method with more sophisticated laboratory equipment; namely, three-liter round bottom flasks heated in a water bath equipped with immersion heaters for temperature control, an electric mixer having a turbine type impeller and dropping funnels for introducing the delayed feed ingredients.

EXAMPLE 4

| Initial Charge | Ingredient | Wt. (gms) |
|---|---|---|
| Medium | Deionized water | 985 |
| Stabilizing Agent | Polyethoxylated nonyl phenol, 30 EtO, 70% aq. sol, Renex 300, ICI do Brasil | 50 |
| Particles | Rutile titanium dioxide pigment, 0.2 mi., 1385-RN-59, Hoechst do Brasil | 80 |
| Monomer | N—vinyl-2-pyrrolidone, V-Pyrol, GAF | 80 |
| Protective Colloid | Hydroxy ethyl cellulose, CELLOSIZE QP-09, Union Carbide | 10 |
| Initial Polym. Initiator: | | |
| Oxidant | t-BHP solution 1 part in 5 parts deionized water | 6 |
| Reductant | SFS solution 1 part in 8 parts deionized water | 9 |
| Delayed Feed: | | |
| Monomer | Mixture: vinyl acetate | 574 |
|  | dibutyl maleate | 143 |
| Polym. Initiator: | | |
| Oxidant | t-BHP solution 3.8 parts in 34 parts deionized water | 37.8 |
| Reductant | SFS solution 2.4 parts in 34 parts deionized water | 36.4 |

The initial charge ingredients were mixed for approximately 20 minutes prior to initation of heating with the water bath maintained at about 80° C. When the charge temperature reached about 50° C., initial oxidant was added and at about 56° C. the initial reductant was added and the water bath temperature dropped substantially by adding cold water, the heaters being subsequently adjusted to maintain a bath temperature of around 50° C. The reaction temperature increased exothermically to around 70° C. and then decayed, and when decay was observed, the delayed feed monomer and catalyst were introduced at the rates of about 6 ml/min for monomer and about 0.25 ml.min for each of the oxidant and reductant simultaneously. The reaction temperature varied roughly between 65° and 70° C. After all of the monomer had been introduced and reacted and the final temperature decay observed, water bath temperature was increased to give a charge temperature of about 70° C. which was maintained for about an hour, which feed rates for the oxidant and reductant being continued for about 20 minutes of this post-heat period to insure complete reaction.

EXAMPLE 5

| Initial Charge | Ingredient | Wt. (gms) |
|---|---|---|
| Medium | Deionized water | 985 |
| Stabilizing Agent | Polyethoxylated nonyl phenol, 100 EtO, 70% aq. sol., Renex 1000, ICI do Brasil | 57 |
| Particles | Titanium dioxide pigment, 0.2 micron, 1385-RN-59, Hoechst do Brasil | 265 |
| Monomer | Vinyl acetate | 80 |
| Protective Colloid | None | — |
| Initial Polym. Initiator: | | |
| Oxidant | Same as Example 4 | 6 |
| Reductant | Same as Example 4 | 9 |
| Delayed Feed: | | |
| Monomer | Mixture: vinyl acetate | 599 |
| | n-butyl-acrylate | 118 |
| Polym. Initiator: | | |
| Oxidant | Same as Example 4 | 37.8 |
| Reductant | Same as Example 4 | 36.4 |

This products of Examples 4 and 5 were tested by bromine titration for residual free vinyl acetate monomer and were found to contain less than 0.5% by weight thereof. The product suspensions showed excellent mechanical stability and degree of dispersion as determined by both hand rub and Waring blender testing. For comparison, a conventional latex paint was prepared from the same pigment and monomers at the same solids content using a Cowles type disperser and dry coatings of the same were evaluated. Coatings obtained with the products of Examples 4 and 5 above displayed significantly better hiding power and surface gloss determined by visual observation.

EXAMPLES 6-9

These examples illustrate the application of the inventive method to so-called U.S. gloss grade titanium dioxide pigments manufactured for paint purposes and treated with various surface treatments by the respective manufacturers.

EXAMPLES 6-9

| Initial Charge | Ingredient | Wt (gms) |
|---|---|---|
| Medium | Deionized water | 960 |
| Stabilizing agent | Polyethoxylated nonyl phenol, 100 EtO, 70% aq. sol, Igepal, CO-997, GAF | 60 |
| Particles | Titanium dioxide pigment, 0.2 micron. Ex. 6 - Tronox CR-800, Kerr-McGee, 95% TiO$_2$, Alumina-treated[1] Ex. 7 - Titanox 2020, N.L. Industries, 94% TiO$_2$, Alumina-treated[1] Ex. 8 - TiPure R-900, du Pont, 94% TiO$_2$, Alumina-treated[1] Ex. 9 - Zopaque RCL-9, Glidden 95% TiO$_2$, Alumina treated[1] | 500 |
| Monomer | Vinyl acetate | 90 |
| Protective Colloid | None | — |
| Initial Polym. Initiator: | | |
| Oxidant | t-BHP solution 0.8 parts in 5 parts deionized water | 5.8 |
| Reductant | SFS 0.8 parts in 7 parts deionized water | 7.8 |
| Delayed Feed: | | |
| Monomer | Vinyl acetate | 410 |
| Polym. Initiator: | | |
| Oxidant | t-BHP solution 3.8 parts in 34 parts deionized water | 37.8 |
| Reductant | SFS 2.4 parts dissolved in 34 parts deionized water | 36.4 |

[1]Type of surface treatment as identified by manufacturer

In Examples 6-9, the delay feed monomer was introduced at the rate of 5.6 ml/min while the oxidant and reductant feed rates were 0.19 ml/min in each case, the reaction temperature being held at about 68° C. In each experiment, the beginning agitation was at about 350 rpm and was increased to the end of the example within the range of 490-605 rmp. The initial oxidant was added when the charge temperature had reached 45° C. and the initial reductant when that temperature reached 55° C. After the introduction of all delayed feed monomer, the charge temperature was raised to 75° C. in a post-heat stage of 30 minutes and during the first 15 minutes of that period, the same oxidant and reductant feed rates were maintained. The reaction vessel was blanketed with nitrogen gas throughout all four experiments. The polymerization reaction during each experiment was followed by observing periodic samples through a light microscope and good deflocculation was apparent in all experiments after the lapse of 7 minutes after the addition of the initial reductant, at which point the delayed feed ingredient introduction was begun.

Although all four titanium dioxide pigments treated in Examples 6-9 were sold as fully equivalent to one another as a gloss grade paint pigment, they exhibited diverse behavior in the process of the present invention as indicated by the respective measured viscosity summarized in the following Table 1.

TABLE I

| Ex. | pH | Stormer, K.U.[1] | Low Shear, cps[2] | High Shear, poise[3] |
|---|---|---|---|---|
| 6 | 5.8 | 72 | 12,500 | 0.58 |
| 7 | 5.7 | 70 | 7,500 | 0.60 |
| 8 | 6.3 | 61 | 1,500 | 0.41 |
| 9 | 6.3 | 65 | 14,000 | 0.45 |

[1]Stormer Viscometer
[2]Brookfield Viscometer, Model LVT, 0.3 rpm, 25° C.
[3]ICI Viscometer, 25° C.

The suspensions obtained in Examples 6-9 were used for applying films to Leneta 3B chart, which are slick surfaced sheets having a solid black band between two solid white bands and are useful in determining the hiding power of paint films. The respective films were applied with a drawdown blade having a 6 mil cap and oven dried at 40° C. The dried films were measured for gloss using a Gardner gloss meter and the results of these measurements are summarized in the following Table II:

TABLE II

| Ex. | 60°[4]Gloss | 20°[5]-Gloss | Contrast Ratio |
|---|---|---|---|
| 6 | 53 | 15 | 0.990 |
| 7 | 55 | 18 | 0.985 |
| 8 | 26 | 3 | 0.985 |
| 9 | 52 | 12 | 0.991 |

[4]Angle of measuring glass from the vertical on dried film
[5]Contained considerable microscopic air apparent as foam Similar films were prepared and dried under ambient temperature, i.e., about 25° C., and it as observed that the film of the product of Example 6 exhibited slight "mud cracking", that for Example 7 exhibited severe "mud cracking" and flaking, while the films obtained with the products of Examples 8 and 9 were smooth and continuous without signs of cracking. It can be commented in this connection that the "mud cracking" phenomenon (which resembles the surface appearance of air dried mud layers) is indicative in the case of polyvinyl acetate of a high molecular weight polymer inasmuch as the minimum filming temperature for polyvinyl acetate is about 28° C. so that coalescence into a continuous film would not be expected in the ambient drying temperature used here.

Samples of the suspensions of Examples 6–9 were observed through an electron microscope and showed no formation of any separate polymer particles.

EXAMPLES 10 and 11

These examples illustrate the complexity in treating particulate matter of very fine particle size; namely, a German anatase titanium dioxide pigment with an average particle size of 0.03 micron sold under the trade designation P-25 by DeGussa.

Examples 10 and 11

| Initial Charge | Ingredient | Ex. 10 Wt (gms) | Ex. 11 Wt (gms) |
|---|---|---|---|
| Medium | Deionized water | 1450 | " |
| Stabilizing agent | Igepal CO-997 | 79 | 107 |
| Particles | P-25 pigment | 500 | 200 |
| Monomer | Vinyl acetate | 90 | " |
| Protective Colloid | None | — | — |
| Initial Polym. Initiator | | | |
| Oxidant | t-BHP solution 0.8 parts in 5 parts deion. water | 5.8 | " |
| Reductant | SFS solution 0.8 parts in 7 parts deion. water | 7.8 | " |
| Delayed Feed: | | | |
| Monomer | Mixture: vinyl acetate | 344 | 672 |
| | n-butylacrylate | 66 | 128 |
| Polym. Initiator: | | | |
| Oxidant | Same as Ex. 6-9 | 37.8 | " |
| Reductant | Same as Ex. 6-9 | 36.4 | " |

The above examples were carried out in equipment simiar to that used for Examples 6–9, the initiation oxidant being added when the charge temperature reached 50° C. and the initiation reductant when that temperature reached 55° C. The delayed monomer was fed at the rate of 5.6 ml/min and each of the delayed oxidant and reductant were fed in Example 10 at the rate of 0.19 ml/min, and in Example 11 at the rate of 0.30 ml/min. After only a few minutes into Example 10, the suspension underwent complete destabilization into a sticky solid mass. It was possible to carry Example 11 to reaction completion but the reaction product exhibited inadequate stabilization when tested by the hand rubbing text by approximately the midpoint of the run.

The course of Example 11 was monitored by periodic removal of samples for electron microscopic observation, magnification ×5400. The sample obtained after the end of the initial reaction stage, as indicated by drop in the reaction temperature, showed evidence of flocculation in the form of flocs of a regular contour along with individual particles having the approximate diameter of the original pigment, i.e., about 0.03 micron. Fifteen minutes after beginning the delayed feed, one could observe the presence of flocs appearing as irregular sponge like masses together with individual particles of apparently increased diameter. After the introduction of 40% of total monomer, the sponge-like appearance of the flocs diminished and the flocs became less irregular in contour while individual particles appeared to have grown to about 0.1–0.3 micron diameter. When 75% of the total monomer had been introduced, the sponge-like flocs had disappeared and one could now observe spheroidal agglomerates of fairly uniform size distribution of approximately 3.0–5.0 micron diameter with occluded particles of about 0.5–0.8 micron diameter. At the end of the treatment, the agglomerates appeared distinctly spheroidal with a size in the range of 3–10 micron or larger, while the individual particles appeared to have diameters greater than 1 micron. At no point could separate polymer particles be detected in the samples periodically taken during Example 11.

It is evident from Examples 10 and 11 that the finely divided pigment processed there required increased amounts of surfactant and that the optimum amount had still not been reached in Example 11, at which point the experiments had to be terminated due to exhaustion of the pigment supply. Obviously, however, the increase in the amount of surfactant and the decrease in the amount of pigment being processed in Example 11 compared to Example 10 showed that substantial improvement in stabilization- had been achieved even though not to an ideal level.

EXAMPLES 12–14

These three examples illustrate the effects of changing the polymer/pigment ratio from 3:1 to 1:1 to 1:3, respectively.

EXAMPLES 12–14

| Initial Charge | Ingredient | Ex. 12 Wt (gms) | Ex. 13 Wt (gms) | Ex. 14 Wt (gms) |
|---|---|---|---|---|
| Medium | Deion. water | 940 | " | " |
| Stabilizing Agent | T-Det N-107 | 56 | 58 | 60 |
| Particles | Titanox 2010[1] | 250 | 500 | 750 |
| Monomer | Vinyl acetate | 75 | " | " |
| Protective Colloid | None | — | — | — |
| Initial Polym. Initiator: | | | | |
| Oxidant | Same as Ex. 1-3 | 5.3 | " | " |
| Reductant | Same as Ex. 1-3 | 8.3 | " | " |
| Delayed Feed: | | | | |
| Monomer | Mixture: | | | |
| | Vinyl acetate | 550 | 346 | 143 |
| | n-butyl acrylate | 125 | 79 | 32 |

-continued

| Initial Charge | Ingredient | Ex. 12 Wt (gms) | Ex. 13 Wt (gms) | Ex. 14 Wt (gms) |
|---|---|---|---|---|
| Polym. Initiator: | | | | |
| Oxidant | Same as Ex. 10 & 11 | 37.8 | " | " |
| Reductant | Same as Ex. 10 & 11 | 36.4 | " | " |

[1] A titanium dioxide pigment of 0.2 micron size containing 97% $TiO_2$ titanium dioxide and designated by the manufacturer N.L. Industries as a general purpose minimum surface treated pigment.

Examples 12–14 were carried out using the same equipment and techniques as employed in Examples 6–11, the initial oxidant being added at a charge temperature of 52° C. and the initial reductant at a temperature of 56° C. The delayed monomer feed rate$^a$ was 5.8 ml/min and the delayed oxidant and reductant feed rate were each 0.19 ml/min. A post-heat stage was applied for 45 minutes at 70° C. following introduction of all monomer, and the catalyst feeds were evident 20 minutes into this post-heat stage. Agitation was applied throughout all runs in the range of 180–540 rpm. The vinyl products were checked for free vinyl acetate monomer by bromine titration and were found to contain less than 0.5% free monomer.

To each of the resultant products, 80–120 ml water as added as necessary to reduce the total solids weight to 48% for comparative evaluation with a commercial acrylic semi-gloss latex enamel paint containing polymer binder and titanium pigment in the weight ratio of 46.5–43.5 for 2.4 pounds per gal titanium dioxide pigment, with no extender pigment, and containing 48% solids by weight. Films were cast from the dilute products of Examples 12–14 and this commercial paint on Leneta 3B charts with a drawdown blade having a 6 mil gap and after air drying for 24 hours were measured for gloss with a Gardner portable gloss meter with the results summarized in Table III.

TABLE III

| | Commercial Paint | Ex. 12 | Ex. 13 | Ex. 14 |
|---|---|---|---|---|
| 60° | 34 | 74 | 72 | 36 |
| 20° | 4 | 36 | 34 | 5 |

While the values set forth in Table III above state the actual readings obtained with the Glossmeter, to the eye of the observer, the apparent gloss of the films produced from the products of Example 12 and 13, where the polymer/pigment ratio is 3:1 and 1:1, respectively, exhibited a distinctly higher and more brilliant gloss than these values would suggest and were vastly superior to those obtained with the commercial latex paint film, particularly in sharpness of image reflection from the surfaces thereof. Although the commercial latex paint had been passed twice through "silkalene" (a fine mesh fabric) to remove the larger particles present, the films obtained with the conventional paint were to the touch unmistakably higher in surface roughness than films produced from the unfiltered products of Examples 12–14.

When evaluated on Leneta 3-B charts, the films of Examples 12–14 possessed excellent hiding power when observed by the eye, the product of Example 14, at the 3:1 polymer/pigment ratio, equivalent to about 0.8 lbs pigment/gallon, matching the hiding power of the commercial paint film despite the latter's content of about 2:4 lbs pigment/gallon. Of the higher ratio films of the invention, i.e. Examples 12 and 13, hiding power appeared to be maximum for the film at the 1:1 ratio, equal to about 2.1 lbs pigment/gallon; the film at the 3:1 ratio, equal to more than 5 lbs pigment/gallon, were almost as good but not superior, as might be suspected from the greater pigment content, due perhaps to higher particle packing. Only with the addition of heavy blue-black toning could the commercial latex film even approach the hiding power of the film of the invention at the 1:1 ratio.

An interesting characteristic of the films of the invention detected on the Leneta charts was the definite tendency of their surfaces to closely follow or transmit the very slight irregularities in the surfaces of these charts, even when applied with 6 mil. thickness, whereas the commercial latex paint film had a smooth surface flatness independent of irregularities in the chart surface. This indicates a desirable tightness of bonding of the instant films.

Films of Examples 12–14 and of the commercial latex paint were tested for scrub resistance following the ASTM scrub test procedure using a Gardner-Straight-Line Washability Tester and the scrub resistance values obtained from such tests are summarized in the following Table IV, the values there representing the average of side-by-side scrubs for the several films:

TABLE IV

| | Scrub Resistance | | | |
|---|---|---|---|---|
| | Commercial Paint | Ex. 12 | Ex. 13 | Ex. 14 |
| 24 hr. air dry Cycles to initial failure | 290 | 1165 | 1160 | 340 |
| 2 week air dry cycles to init. failure | 260 | 2260 | 2140 | — |
| 4 week air dry cycles to init. failure | 295 | 3480 | 2400 | — |

The striking improvement in the scrub resistance values for the films of the invention is evident from Table IV, recalling that the product of Example 13 is substantially equivalent in polymer content with the commercial latex paint. It is notable that there is very little difference between the values for Examples 12 and 13 despite the three-fold difference in polymer which indicates that once the particles have been well encapsulated, the addition of further polymer does not impart further scrub resistance. Even for Example 14 where the polymer content had been reduced to about one-third of the commercial paint, the scrub resistance values were fully comparable to those of the commercial paint.

Product samples from Examples 12–14 were observed with a conventional electron microscope and no evidence of the presence of separate pure polymer particles could be seen, even for Example 12 where a great excess of polymer is present. A sample of Example 13 was also examined by transmission electron microscopy (with the light shining through the sample from beneath) and the existence of a polymer sheath or envelope around individual pigment particles could be readily perceived. Film samples of the Example 13 product and the commercial latex paint were further observed by electron microscope (mag. ×10,000) in cross-sections prepared both by microtoming and "cold-fracturing", and distinct differences in structural regularity and the spacing of the pigment particles were readily visible. The inventive film displayed a dense, coherent, virtually void-free structure with the pigment particles totally integrated therein; in contrast, the commercial paint film contained a substantial proportion of void spaces, giving the polymer binder a kind of matrix structure and distinct pigment particles together with occasional isolated polymer particles were easily recognized, the pigment particles tending to be grouped into clusters rather than uniformly and homogeneously distributed through a continuous polymer layer in the inventive material.

EXAMPLES 15 and 16

These examples illustrate the practice of the present invention in preparing 76.2% PVC paints using standard emulsion polymerization techniques.

| Material | Specific Ingredient | Example 15 Wt. (gms) | Example 16 Wt. (gms.) |
|---|---|---|---|
| Initial Charge | | | |
| Medium | deionized water | 430 | 430 |
| Stabilizing Agent | Igepal CO-997 | 57 | 15.2 |
| Monomer | vinyl acetate | 89 | 89 |
| | n-butyl acrylate | 25 | 25 |
| | n-vinyl-2-pyrrolidone (V-Pyrol) | 0 | 25 |
| Mix for 15 min. at room temp. at 200 rpm, then add: | | | |
| Particles | TiPure R-902, du Pont, 90% TiO$_2$, alumina-treated | 210 | 210 |
| Mix for 15 min. at room temp. at 300 rpm, then add: | | | |
| Particles | Celite 281, silicate, Johns-Manville | 96 | 96 |
| Mix for 15 min. at room temp. at 400 rpm, then add: | | | |
| Particles | Gold Bond R silica, (288 gms. silica mixed with 200 gms. water) | 288 | 288 |
| Medium | water | 200 | 200 |
| Mix for 15 min. at room temp. at 400 rpm, then add: | | | |
| Particles | ASP-170, china clay slurry, Engelhard (292 gms. in 200 gms. water in Example 15, 292 gms. in 300 gms. water for Example 16) | 292 | 292 |
| Medium | water | 200 | 300 |
| Mix for 15 min. at room temp. at 500 rpm, then add: | | | |
| Oxidant | t-BHP solution 1.3 wt. parts (in 5 wt. parts deionized water) | 1.3 | 1.3 |
| Medium | deionized water | 5.0 | 5.0 |
| Raise temp. to 50° C., then add: | | | |
| Reductant | SFS solution (1.3 wt. parts in 8 wt. parts deionized water) | 1.3 | 1.3 |
| Medium | deionized water | 8.0 | 8.0 |
| React for 1 hr. at 68° C., then add: | | | |
| Colloid | Colloids 581-B | 2 | 0 |

The resulting reaction mixture was cooled to room temperature. The resulting polymer encapsulated pigment latexes of these examples has the following properties:

| Property | Example 15 | Example 16 |
|---|---|---|
| wt. % solids | 53.1 | 52.1 |
| Stormer viscosity, KU | 93 | 100 |
| Brookfield viscosity, 0.3 rpm, cps | 64000 | 56000 |
| ICI viscosity, poise | 0.5 | 0.5 |
| pH | 7.5 | 7.9 |
| Film appearance, 6 mil gap, 3B chart | smooth non-grainy | smooth non-grainy |
| Contrast ratio, dry | 0.99 | 0.99 |
| Contrast ratio, wet | 0.985 | 0.99 |

EXAMPLE 17

This example illustrates an emulsion polymerization technique for producing a latex of polymer encapsulated pigments. The latex was prepared by admixing in a reactor purged with nitrogen 485 gms. of water, 26 gms. of titanium dioxide pigment (TiPure R-900) and 238 gms. of kaolin clay as an extender (Satintone #5) and the resulting mixture was agitated for a short period at about 200 rpm. Thereafter, 87 gms of V-Pyrol were added following which the resulting mixture was agitated for about 5 minutes at 250-270 rpm. Then 51 gms of polyethoxylated nonyl phenol containing about 50 ethylene oxide units per molecule as a 70 wt. % aqueous solution (T-DET-N-507) were added and agitation at 270 rpm was continued for 5 minutes. Thereafter, 1 gm. of Nalco 71-D5 antifoam was added. Then, the initial catalyst comprising 1.3 gms. of t-BHP dissolved in 5 gms. of deionized water was added to the mixture and further mixed for 5 minutes at 270 rpm. The initial reductant comprising 1.3 gms. of SFS dissolved in 8 gms. of deionized water were added to the reaction vessel and the temperature was increased to about 50° C. (immersing the vessel in a bath maintained at about 60° C.) When the reactor exotherm, produced by the polymerizing V-Pyrol, caused the temperature to reach 60° C. to 65° C. in the reactor, the monomer and catalyst/reductant feeds were begun. The monomer feed comprised a mixture of 550 gms. of vinyl acetate, 155 gms. of n-butyl acrylate and 7 gms. of Nalco 71-D5 antifoam agent and was fed in over a four hour period. The catalyst (oxidant) feed contained 3.63 gms. of t-BHP in 34.4 gms. of deionized water (38 ml. of 9.57 wt. % t-BHP in water) and the reductant feed contained 2.3 gms. SFS dissolved in about 32.7 gms. of water (35 ml. of a 6.59 wt. % SFS aqueous solution). Each of these feeds were linearly fed in concurrently over a period of 3¾ to 4 hours while the bath temperature was maintained at about 70° C. The temperature during the 4 hour period was maintained at about 65° C. to 70° C. and agitation was increased to maintain a vortex for good mixing. The reaction mixture then was post heated at 70° C. to 75° C. for an additional 30 minutes under minimal agitation. Thereafter, 0.75 gm. of Dowicil 75 biostat in 3 gms. of deionized water was added to the reaction mixture which was then cooled. There resulted a stable latex resembling a latex paint.

What is claimed is:

1. A stable aqueous suspension of discrete finely divided solid particles each encapsulated, under agitation less than high shear mixing, within an envelope of a water-insoluble addition polymer which is substantially free of ionically charged groups, the shape of said encapsulated particles generally conforming to the shape of the starting particles and the size of said encapsulated particles being determined by the starting solid partciles being determined by the starting solid particles plus the polymer layer formed thereon, said polymer layer being substantially uniform over the entirety of the surface of said solid particles, aqueous suspension being stabilized by a nonionic, surface active, stabilizing agent, said suspension being free of anionic or cationic surface active or dispersing agents, having high hiding power and being resistant to settling.

2. Stable aqueous suspension as claimed in claim 1, wherein said finely divided particles are titanium dioxide particles.

3. Stable aqueous suspension as claimed in claim 1, wherein said finely divided particles are clay particles.

4. Stable aqueous suspension as claimed in claim 1, wherein said finely divided particles are talc particles.

5. Stable aqueous suspension as claimed in claim 1, wherein said polymer is a copolyer of vinyl acetate and n-butyl acrylate.

6. Stable aqueous suspension as claimed in claim 1, wherein said polymer is a vinyl acetate polymer.

7. Stable aqueous suspension as claimed in claim 1, wherein said polymer is an N-vinyl-2 pyrrolidone polymer.

8. Stable aqueous suspension as claimed in claim 1, wherein said polymer is a copolyer of vinyl acetate and dibutyl maleate.

9. Stable aqueous suspension as claimed in claim 1, wherein said polymer envelope comprises an N-vinyl-2-pyrrolidone polymer layer and a layer of a copolymer of vinyl acetate and n-butyl acrylate.

10. Stable aqueous suspension as claimed in claim 1, wherein said polymer envelope comprises a polymer of N-vinyl-2-pyrrolidone polymer layer and a layer of a copolymer of vinyl acetate and dibutyl maleate.

11. Stable aqueous suspension as claimed in claim 1, wherein said polymer envelope comprises a vinyl acetate polymer layer and a layer of a copolymer of vinyl acetate and n-butyl acrylate.

* * * * *